Patented June 18, 1935

2,005,667

UNITED STATES PATENT OFFICE 2,005,667

STABLE SOLUTION OF MORPHINE

Adolf Steinbrenck, Frankfort-on-the-Main, Germany, assignor to Merz & Co., Frankfort-on-the-Main, Germany No Drawing. Application March 7, 1932, Serial No. 597,411. In Germany March 28, 1931

2 Claims. (Cl. 167—67)

It is known that morphine solutions, e. g. solutions of morphine hydrochloride after sterilization become yellow when kept for some time. These solutions are not neutral, but have an acidity corresponding to a hydrogen ion concentration of pH 5.4.

It is also known that small additions of acid make the solution substantially more stable. These additions, however, have the great disadvantage that the hydrogen ion concentration of the solution is depressed to a pH value of 4.4–4.0 and therefore vary far from the neutral point, the pH value for which is 7.0. In spite of their keeping qualities, solutions having such acidity are undesirable.

It has now been found that the acidic character of such a morphine solution can be practically removed and furthermore the yellowing can be prevented, the sterile properties of the solution being maintained, however, if suitable quantities of phenyldimethyl pyrazolone are added to the solution. In this way the hydrogen ion concentration is improved by being raised to pH 7.0 and a solution obtained which, as already mentioned, remains practically unchanged for a very long time, and consequently the disadvantages which are inherent in the solutions heretofore used are removed.

Example.—First of all a solution of 5 grams of solium sulphite and 72 cc. of N/10 hydrochloric acid per litre is made. If 1 gram of morphine hydrochloride is dissolved in 100 cc. of this solution, then the alkaloid which initially dissolves soon separates out again. However, if 5 grams of phenyldimethyl pyrazolone are previously added to the same solution mixture then a pH value of about 7.0 is obtained and the morphine remains in solution without exhibiting any tendency to come out. The solution is sterile, does not become yellow and avoids the undesirable acidity of pH 5.4–4.0 shown by the morphine solution hitherto usual.

It is obvious that the process claimed can be used with advantage not only for making morphine solutions but also for making solutions of other alkaloids as well.

What I claim is:—

1. A stable solution of morphine hydrochloride for injection purposes, comprising an aqueous solution of about 5 grams of sodium sulphite in which 1 gram morphine hydrochloride is dissolved together with about 72 cu. cms. N/10 hydrochloric acid and phenyl-dimethyl pyrazolone giving the composition a pH value of about 7.

2. A stable solution of morphine hydrochloride for injection purposes, comprising an aqueous solution of about 5 grams of sodium sulphite in which 1 gram morphine hydrochloride is dissolved together with about 72 cu. cms. N/10 hydrochloric acid and 5 grams of phenyl-dimethyl pyrazolone.

ADOLF STEINBRENCK.